Oct. 30, 1951 R. G. LE TOURNEAU 2,573,584
LOAD DISCHARGING UNIT FOR VEHICLES
Filed Sept. 24, 1949 2 SHEETS—SHEET 1

INVENTOR:
R. G. LeTOURNEAU
BY
F. D. Copeland Jr.
AGENT

Oct. 30, 1951  R. G. LE TOURNEAU  2,573,584
LOAD DISCHARGING UNIT FOR VEHICLES
Filed Sept. 24, 1949  2 SHEETS—SHEET 2
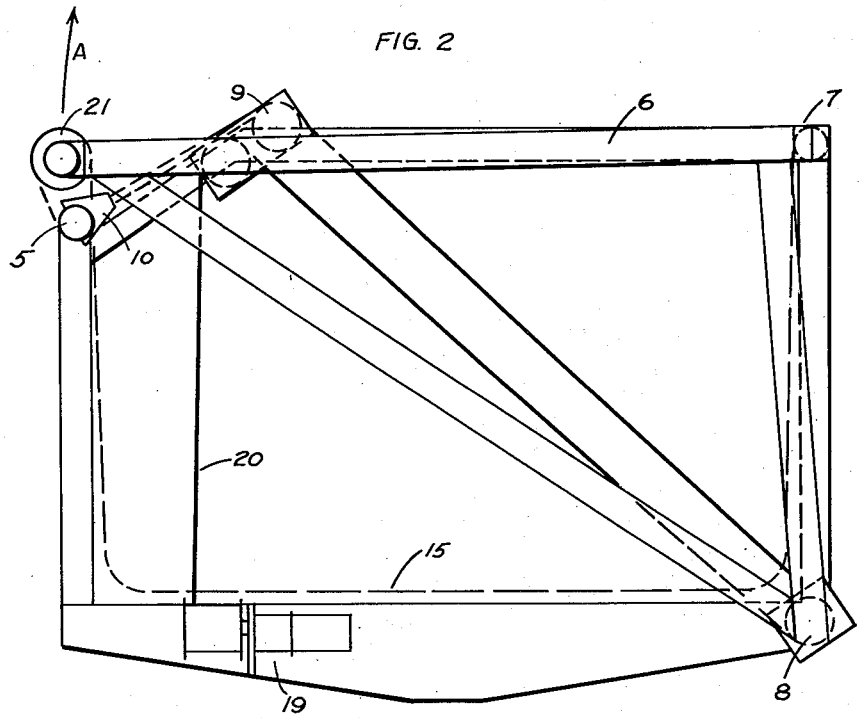
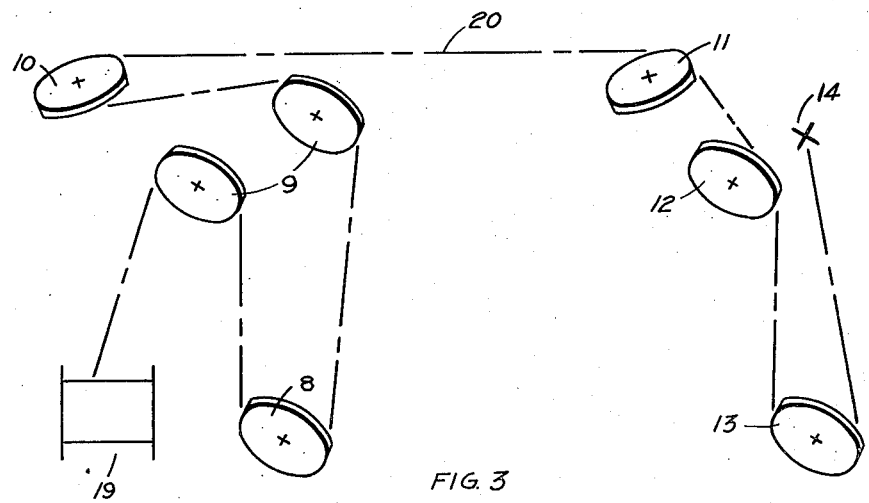
INVENTOR:
R. G. LeTourneau
BY
F. D. Copeland Jr.
AGENT

Patented Oct. 30, 1951

2,573,584

UNITED STATES PATENT OFFICE 2,573,584

LOAD DISCHARGING UNIT FOR VEHICLES

Robert G. Le Tourneau, Longview, Tex., assignor to R. G. Le Tourneau, Inc., Peoria, Ill., a corporation of California Application September 24, 1949, Serial No. 117,581

8 Claims. (Cl. 214—82)

The present invention relates to and it is an object to provide a novel arrangement for discharging a load from a hauling unit.

Another object of this invention is to provide a load discharging unit which is especially adapted for use with loose bulk materials such as sugar cane, hay, and the like.

A further object is to provide a load discharging unit of this type which is entirely mechanical in operation and which can be controlled from the operator's cockpit.

It is also an object to provide an electrically controlled load discharging unit which is supplied with power from a generator mounted on the prime mover.

An additional object is to provide a load discharging unit which is an integral part of the hauler and which does not reduce the payload capacity of the hauler any appreciable amount.

A still further object is to provide a load discharging unit which is cable controlled and whose load handling section is an open mesh net; these conditions thus causing the unit to be self cleaning and relatively light in weight.

These objects are accomplished by means of such structure and relative arrangement of parts as will fully appear by a perusal of the following specification and claims.

Referring to the accompanying drawing:

Figure 2 is an end view of the front of a trailer unit containing this invention, with the trailer hitch yoke removed.

Figure 3 is a diagrammatic representation of the cable control system used to operate this unit.

Figure 1:
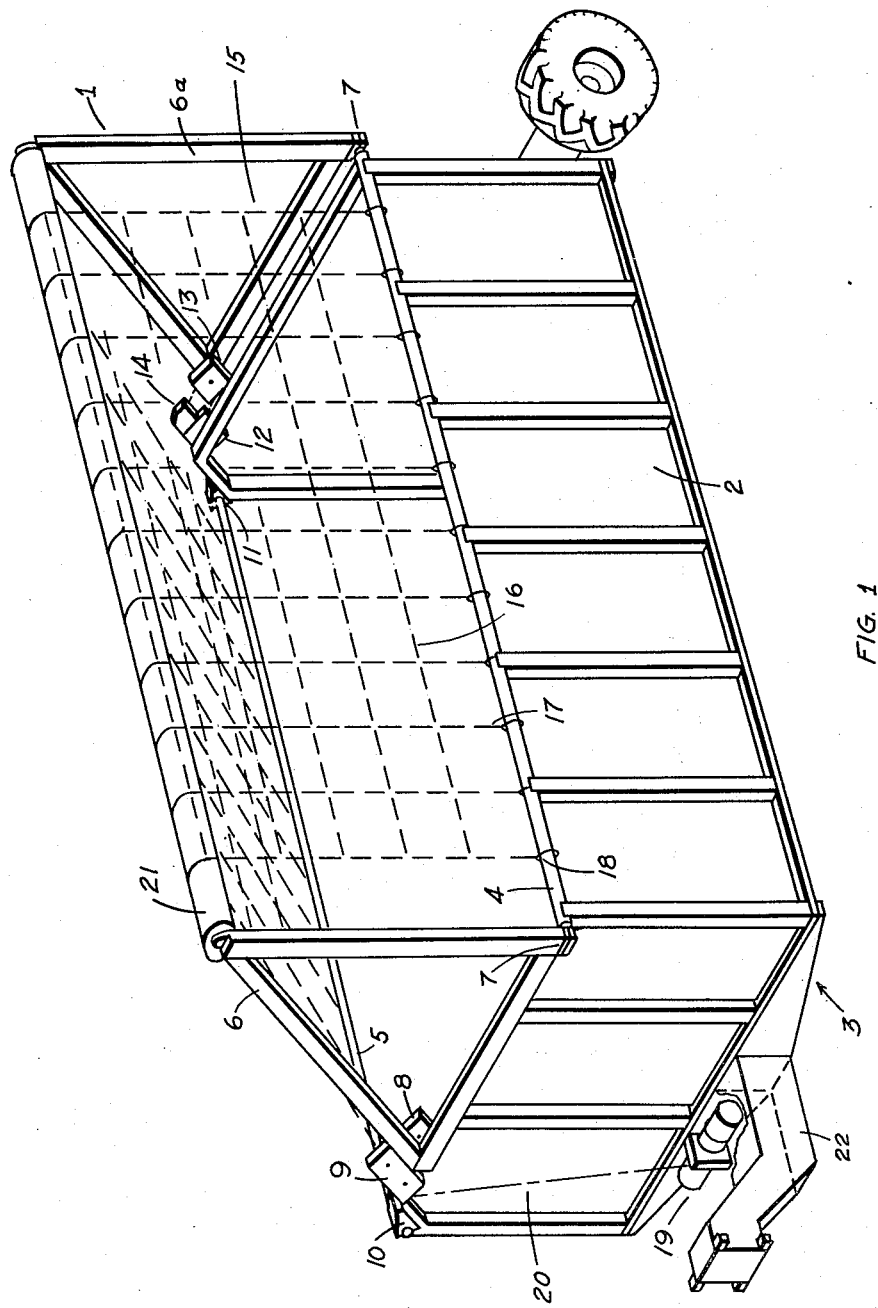
Figure 1 is an isometric view of the load discharging unit installed on trailer containing a stake bed.

Referring now more particularly to the characters of reference on the drawing, the load discharging unit, shown generally at 1 is here installed on the stake bed or body 2 of a trailer 3. The unit itself contains two anchor rails 4 and 5, of tubular construction, attached to the upper side panels of the stake body 2. A triangular frame 6 is pivoted to each end of anchor tube 4 by means of split journal boxes 7 which engage ball and socket units at the ends of anchor tube 4. Another apex of triangular frame 6 is journalled to a rolling lift beam 10 to permit free rolling of the latter. The remaining apex of this triangle is affixed to a sheave 8 which is part of the control cable system shown diagrammatically in Figure 3. At the forward end of the stake body 2 and near the other tube 5, a double sheave unit 9 is attached. A direction changing sheave 10 is attached to anchor rail 5 at such a position as to receive cable 20 from sheave unit 9. A second direction changing sheave 11 is installed at the opposite end of rail 5 and cable is directed from this sheave over sheave 12 and under and around sheave 13 of triangular frame 6a and back to dead-end 14. The loading net 15 is of open mesh construction consisting of a series of parallel longitudinal chains 16 and similarly spaced transverse chains 17. The transverse chains are formed with loops 18 at each end which surround anchor rails 4 and 5 and thereby form a flexible connection between the net 15 and stake body 2.

Power for operation of the load discharging unit is obtained from an electric winch 19 which is run by current supplied by a generating unit of the prime mover (not shown). The winch unit is mounted to the trailer frame with the cable take-off substantially in line with the sheave unit 9. A prime mover is attached to the trailer 3 at the front end thereof by means of hitch yoke 22 to form a unitary load discharging vehicle.

When the rig is in its initial and empty position, the rolling lift beam 21 is resting adjacent anchor rail 5, as shown in Fig. 2, and the net 15 is hanging loosely against the sides and bottom of the stake bed. When the winch motor is operated in a direction to reel in cable 20, the distance between sheaves 8 and 9 at the front end and 13 and 14 at the rear is shortened and triangular frame 6 moves in an arc from its lower to upper position. Rolling lift beam 21 moves about its pivot 7 in an arc A above the top of the body. In so doing, the net is swept clean of its load, which is tumbled over the side from above anchor tube 4. At the uppermost position of beam 21, as shown in Fig. 1, the net is taut and free of load. The beam 21 rolls under the net and in so doing forces back that portion of the load which tends to protrude thru the opening in the net. The end loops 18 are loosely attached to the anchor rails 4 and 5 and will freely turn in response to movement of the net.

From the foregoing description, it will be readily seen that I have produced such an implement as substantially fulfills the objects of the invention as set forth herein.

While this specification sets forth in detail the present and preferred construction of this load discharging unit, still in practice such deviations from such detail may be resorted to as do not form a departure from the spirit of the invention as described in the appended claims.

Having thus described the invention, the fol- lowing is claimed as new and useful and upon which Letters Patent is desired:

1. A load discharging unit comprising side rails installed near the top of an open top body, a frame pivoted to each end of one of said rails, a roller journalled to said frames adapted to be moved with the frames independently of the body from a position near the other rail to a position substantially above said one rail, a net filling the interior of the body and attached to the side rails, said roller in contact with the underside of the net and adapted to raise the net while moving along the underside thereof and thereby discharge a load contained therein.

2. A load discharging unit comprising side rails installed near the top of an open top body, a frame pivoted to each end of one of said rails, a roller connected to the frame adapted to be moved with the frame from a position near the other rail to a position near the vertical, a net filling the interior of the body and attached to the side rails, said roller in contact with the underside of the net and cable controlled means adapted to raise the net and discharge any load contained therein; said cable controlled means being a single cable leading from a winch at the front of the body upward to one sheave of a double sheave block fixed to the body, downward to a sheave attached to the pivoted frame, upward and over the second sheave of said double sheave block, down and around a corresponding pair of direction changing sheaves affixed to the body, and thence to a sheave affixed to the body at the rear, down and around a sheave of the rear mounted frame member, and up to and deadended to said rear body sheave.

3. A load discharging unit as in the next preceding claim in which the cable passing between the direction changing sheaves passes thru the hollow tubular side rail.

4. A load discharging unit comprising side rails installed on a trailer having an open top body, a triangular shaped crank pivoted at each end of one of said side rails by a pivotal connection at one apex of the triangle, a sheave connected to a second apex of each crank, and a roller journalled to the third apex of said triangular crank; a net attached loosely between the side rails, power means adapted to cause said roller to engage the underside of the net and raise same until it becomes taut; said power means being an electrically driven cable system reeved between sheaves on the fixed body and sheaves on the movable cranks; the upward movement of said roller being limited at the point of contact between the corresponding sheaves on the body and the crank.

5. A load discharging unit comprising side rails installed on a trailer having an open top body, a triangular shaped crank pivoted at each end of one of said side rails by a pivotal connection at one apex of the triangle, a sheave connected to a second apex of each crank, and a roller journalled to the third apex of said triangular crank; a net attached loosely between the side rails, power means adapted to cause said roller to engage the underside of the net and raise same until it becomes taut, the position at which the net becomes taut being arranged at approximately the position at which the roller is directly over the side rail to which the cranks are pivoted.

6. A load discharging unit comprising side rails installed on a trailer having an open top body, a triangular shaped crank pivoted at each end of one of said side rails by a pivotal connection at one apex of the triangle, a sheave connected to a second apex of each crank, a roller journalled to the third apex of said triangular crank; a net attached loosely between the side rails, power means adapted to cause said roller to engage the underside of the net and raise same until it becomes taut, the position at which the net becomes taut being arranged at approximately the position at which the roller is directly over the side rail to which the cranks are pivoted; said position being such that the contents of the net will be discharged over the side of the body.

7. A load discharging unit for a vehicle having a bed and side rails comprising: a pair of spaced arms respectively pivoted adjacent each end of one of said side rails; a roller carried by the free ends of said arms and adapted to be moved from a position substantially directly overlying the other of said side rails to a position substantially directly overlying said first mentioned side rail; a screen attached to said unit on each outer side of each of said side rails and passing over each of said side rails and adapted to lie in one position adjacent the said side rails and the bottom of said bed; said screen passing over said roller; whereby upon pivoting said arms and said roller to said position overlying said first mentioned side rail said screen is stretched taut with one portion thereof lying in a substantially vertical plane to eject the load.

8. A load discharging unit comprising side rails installed near the top of an open top body, a frame pivoted to each end of one of said rails, a roller journalled to the frames and adapted to be moved with the frames independently of the body, a load carrying net overlying the bottom and sides of said body, said roller in contact with the underside of the net and adapted to raise the net and sweep the load in the net over one side rail by rolling along the underside of the net and while moving the net from its position of recline against the interior of said body to a taut position above the body, in the last named position said net assuming a triangular form above the side rails.

ROBERT G. LE TOURNEAU.

REFERENCES CITED

The following references are of record in the file of this patent:

UNITED STATES PATENTS

| Number | Name | Date |
| --- | --- | --- |
| 1,088,100 | Saunders et al. | Feb. 24, 1914 |
| 1,293,239 | Strauss | Feb. 4, 1919 |
| 2,351,104 | Carter | June 13, 1944 |
| 2,407,430 | MacRae | Sept. 10, 1946 |

FOREIGN PATENTS

| Number | Country | Date |
| --- | --- | --- |
| 318,330 | Great Britain | Sept. 5, 1929 |
| 798,172 | France | Mar. 2, 1936 |